United States Patent [19]
Ochi et al.

[11] Patent Number: 6,007,783
[45] Date of Patent: *Dec. 28, 1999

[54] FLUE GAS TREATING SYSTEM AND PROCESS

[75] Inventors: Eiji Ochi; Kiyoshi Okazoe; Makiichi Ishihara, all of Tokyo; Toru Takashina, Hiroshima, all of Japan

[73] Assignee: Mitsubishi Heavy Industries, Ltd., Tokyo, Japan

[*] Notice: This patent is subject to a terminal disclaimer.

[21] Appl. No.: 08/927,787

[22] Filed: Sep. 11, 1997

[30] Foreign Application Priority Data

Oct. 17, 1996 [JP] Japan ................................... 8-294635

[51] Int. Cl.⁶ ..................................................... B01D 53/34
[52] U.S. Cl. ........................ 422/171; 422/169; 422/224; 422/225; 422/108
[58] Field of Search ..................................... 422/168–171, 422/172, 224, 225, 231, 234, 105, 114, 110, 108; 423/555, 235, 237, 242.1, 242.2, 215.5; 95/223–224, 128, 9, 169, 199, 232, 235; 96/109, 108, 244, 265, 270

[56] References Cited

U.S. PATENT DOCUMENTS 5,132,027  7/1992  Ukawa et al. ......................... 423/555
5,160,707  11/1992  Murray et al. ......................... 422/170
5,246,678  9/1993  Ochi et al. ......................... 423/243.08
5,840,263  11/1998  Shinoda et al. ......................... 422/169

FOREIGN PATENT DOCUMENTS 6-327927  11/1994  Japan .

*Primary Examiner*—Hien Tran
*Attorney, Agent, or Firm*—Myers Bigel Sibley & Sajovec, P.A.

[57] ABSTRACT

This invention provides a flue gas treating system which, though having a basic construction using a small-sized and high-performance gas-liquid contact apparatus comprising the combination of a parallel-flow absorption tower and a counterflow absorption tower, can reduce the ammonia concentration in the treated flue gas to a low level. This system includes a tank (21) for holding an absorbing fluid fed thereto; an inlet side absorption tower (22) of the counterflow type which extends upward from one lateral part of the tank (21) and in which untreated flue gas (A) is introduced from its lower end and brought into gas-liquid contact with the absorbing fluid within the tank (21); and an outlet side absorption tower (23) of the parallel-flow type which extends upward from another lateral part of the tank (21) and in which the flue gas leaving the inlet side absorption tower (22) is introduced from its upper end and brought into gas-liquid contact with the absorbing fluid within the tank (21).

5 Claims, 4 Drawing Sheets

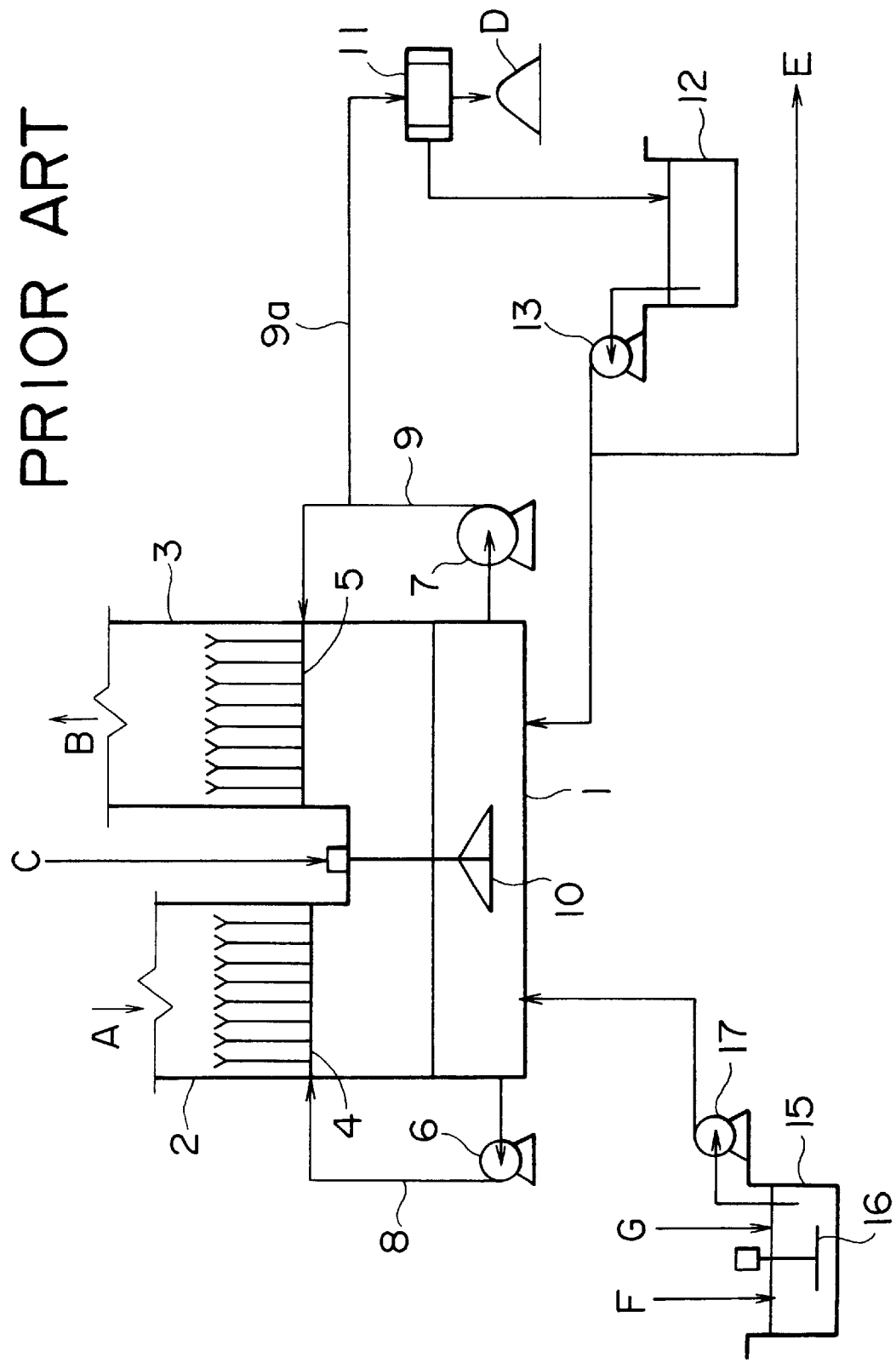

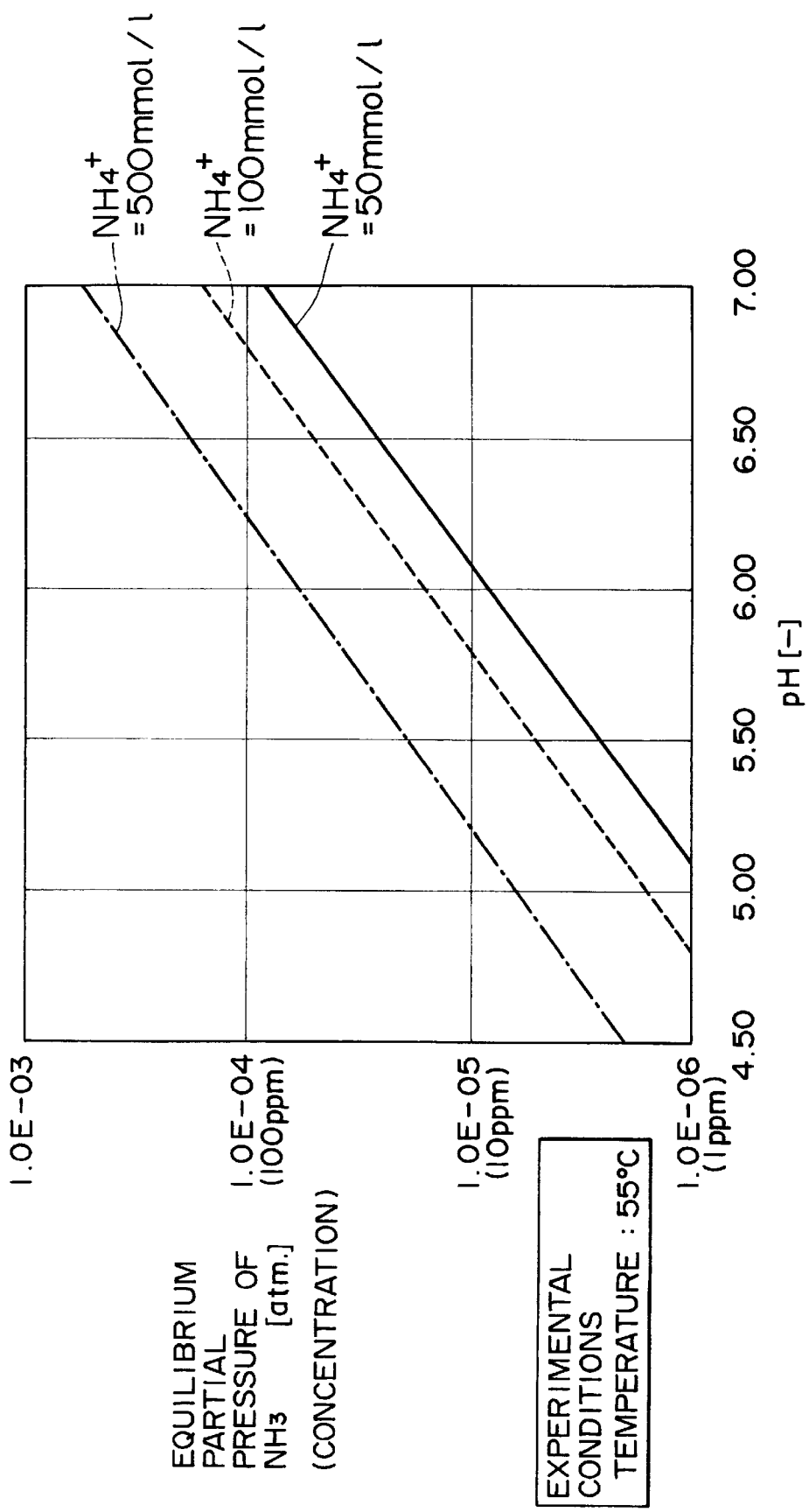

FLUE GAS TREATING SYSTEM AND PROCESS

FIELD OF THE INVENTION AND RELATED ART STATEMENT

This invention relates to a technique for efficiently carrying out the desulfurization of flue gas and the removal of ammonia with small-sized equipment construction. More particularly, it relates to a flue gas treating system and process which can achieve a high degree of ammonia removal.

Conventionally, there have been known such flue gas treating processes using an absorption tower (or gas-liquid contact tower) of the packed tower type or an absorption tower of the spray tower or liquid column type. In these absorption towers, sulfur oxides (typically sulfur dioxide) and other contaminants present in flue gas are removed by bringing the flue gas into gas-liquid contact with an absorbing fluid having an absorbent (e.g., limestone) suspended therein.

However, both in conventional flue gas treating systems of the packed tower type and in conventional flue gas treating systems of the spray tower or liquid column type, their basic construction has generally been such that one gas-liquid contact tower is installed for one absorbing fluid tank. Thus, there has been a limit in attempts to achieve higher desulfurization capability, reduce the size and cost, and improve maintainability.

Specifically, in order to achieve higher performance, it is basically required to increase the number of stages of the spray nozzles in the spray tower type, the liquid column height in the liquid column type, or the height of the packed region in the packed tower type. Consequently, the overall size of the equipment (in particular, the height of the absorption tower) and the number and height of the ducts and pipes connected thereto are markedly increased. In addition, the capacity and power consumption of the pumps for raising the absorbing fluid are also increased considerably.

Accordingly, in Japanese Patent Application No. 118171/'93 (Japanese Patent Laid-Open No. 327927/'94) and the like, the present applicant has proposed a system which can achieve an improvement in performance and a reduction in size beyond the limits of conventional systems.

This system is of the so-called parallel-flow/counterflow type in which two absorption towers of the liquid column type (i.e., parallel-flow and counterflow absorption towers) are juxtaposed above a tank for storing an absorbing fluid and in which flue gas is successively introduced into these absorption towers and brought into gas-liquid contact with the absorbing fluid in the respective absorption towers. This system not only affords a reduction in overall size (chiefly in the height of the absorption towers) and in costs (both in equipment cost and in operating cost), but also achieves high desulfurization and dedusting capabilities.

One example of a conventional flue gas treating process using such a gas-liquid contact apparatus of the parallel-flow/counterflow type is described below with reference to FIG. 3.

In this flue gas treating process, there is used a gas-liquid contact apparatus comprising a tank 1 to which an absorbing fluid having an absorbent (i.e., limestone) suspended therein (hereinafter referred to as the absorbent slurry) is fed, an inlet side absorption tower 2 of the liquid column type which extends upward from one lateral part of tank 1 and serves to bring untreated flue gas A into gas-liquid contact with the absorbent slurry within tank 1, and an outlet side absorption tower 3 of the liquid column type which extends upward from another lateral part of tank 1 and serves to bring the flue gas leaving inlet side absorption tower 2 into gas-liquid contact with the absorbent slurry within tank 1 again.

The aforesaid inlet side absorption tower 2 is a so-called parallel-flow absorption tower in which untreated flue gas A is introduced from the top and caused to flow downward. On the other hand, the aforesaid outlet side absorption tower 3 is a so-called counterflow absorption tower in which a flue gas outlet section (not shown) for discharging treated flue gas B is formed eat its upper end so as to cause the flue gas having passed through inlet side absorption tower 2 and the upper space of tank 1 to flow upward.

Moreover, in each of absorption towers 2 and 3, a plurality of spray pipes 4 or 5 are disposed in parallel. In these spray pipes 4 or 5, a plurality of nozzles (not shown) for injecting the absorbent slurry upward in the form of liquid columns are formed.

Furthermore, circulating pumps 6 and 7 for withdrawing and raising the absorbent slurry within tank 1 are installed on the outside of tank 1. Thus, the absorbent slurry is fed to spray pipes 4 and. 5 through circulation lines 8 and 9, respectively, and injected upward from the nozzles thereof.

The gas-liquid contact apparatus illustrated in FIG. 3 is equipped with a so-called rotating-arm air sparger 10 for blowing air C for oxidizing use into the slurry within tank 1 in the form of fine air bubbles while agitating the slurry, so that the absorbent slurry having sulfur dioxide absorbed therein is brought into efficient contact with the air in tank 1 and thereby completely oxidized to form gypsum.

More specifically, in this process, the absorbent slurry injected from spray pipes 4 or 5 within absorption tower 2 or 3 flows downward while absorbing sulfur dioxide and dust as a result of gas-liquid contact with flue gas, and enters tank 1 where it is oxidized by contact with a large number of air bubbles blown thereinto while being agitated with air sparger 10, and then undergoes a neutralization reaction to become a slurry containing gypsum at a high concentration. The dominant reactions occurring in the course of these treatments are represented by the following reaction formulas (1) to (3).

(Flue gas inlet section of absorption tower)

$$SO_2+H_2O \rightarrow H^++HSO_3^- \tag{1}$$

(Tank)

$$H^++HSO_3^-+1/2O_2 \rightarrow 2H^++SO_4^{2-} \tag{2}$$

$$2H^++SO_4^{2-}+CaCO_3+H_2O \rightarrow CaSO_4 \cdot 2H_2O+CO_2 \tag{3}$$

Thus, a large amount of gypsum, a small amount of limestone (used as the absorbent), and a slight amount of dust collected from the flue gas are steadily suspended or dissolved in the slurry within tank 1. In this process, the slurry within tank 1 is withdrawn and fed to a solid-liquid separator 11 through a pipe line 9a branching from circulation line 9. The slurry is filtered in solid-liquid separator 11, so that gypsum D having a low water content is recovered. On the other hand, the filtrate from solid-liquid separator 11 is introduced into a filtrate tank 12 and then delivered by means of a pump 13. A portion of the filtrate is recycled to tank 1 as water constituting the absorbent slurry, and the remainder is discharged as desulfurization waste water E in order to prevent the accumulation of impurities.

In this process, a slurry containing limestone as the absorbent is fed from a slurry preparation tank 15 to tank 1 during operation. This slurry preparation tank 15 is equipped with a stirrer 16 and serves to prepare an absorbent slurry by mixing powdered limestone F introduced from a silo (not shown) with supplied water G (such as industrial water), and stirring this mixture. The absorbent slurry within slurry preparation tank 15 is suitably fed to tank 1 by means of a slurry pump 17.

Moreover, in order to make up for the water gradually lost owing to evaporation in absorption tower 2 and 3 or the like, make-up water (such as industrial water) is suitably supplied, for example, to tank 1.

During operation, the flow rate of the aforesaid make-up water supplied to tank 1, the flow rate of the slurry withdrawn through pipe line 9a, and the like are suitably controlled. Thus, tank 1 is maintained in such a state that the slurry containing gypsum and the absorbent at predetermined concentrations is always stored therein at a level within certain limits.

Also during operation, in order to maintain the degree of desulfurization and the purity of gypsum at a high level, the boiler load (i.e., the flow rate of flue gas A), the sulfur dioxide concentration in untreated flue gas A, the pH and limestone concentration of the absorbent slurry within tank 1, and the like are detected with sensors. On the basis of the results of detection, the feed rate of limestone to tank 1 and other parameters are suitably controlled by means of a controller (not shown). Conventionally, the pH of the absorbent slurry within tank 1 is usually adjusted to about 6.0 so that highly pure gypsum may be formed by accelerating the above-described oxidation reaction while maintaining the high capacity to absorb sulfur dioxide.

However, the flue gas treating process using the above-described gas-liquid contact apparatus of the parallel-flow/counterflow type, which has been proposed by the present applicant and put to practical use, involves a problem to be solved. That is, if untreated flue gas A contains ammonia, this ammonia is released as a gas in outlet side absorption tower 3 of the counterflow type and, as a result, a large amount of ammonia is discharged together with treated flue gas B.

More specifically, in a flue gas treating system used, for example, for an oil-fired boiler of a thermal electric power plant, ammonia is usually injected into flue gas at a position upstream of the desulfurizer in order to capture sulfur trioxide ($SO_3$) present in the flue gas as ammonium sulfate $\{(NH_4)_2SO_4\}$. Consequently, untreated flue gas A introduced into an absorption tower for desulfurizing purposes contains ammonia in an amount of up to about 100 ppm. In the conventional gas-liquid contact apparatus of the parallel-flow/counterflow type illustrated in FIG. 3, most of this ammonia is dissolved and absorbed into the slurry in inlet side absorption tower 2 of the parallel-flow type, so that the ammonia concentration in the flue gas is once reduced to a level of up to about 10 ppm at the outlet section of inlet side absorption tower 2. However, since the slurry injected into the upper part of outlet side absorption tower 3 and brought into contact with the flue gas has a high pH value of about 6, the partial pressure of ammonia in the upper part of this absorption tower 3 is increased. As a result, the ammonia contained in the slurry is released into the flue gas again, so that the ammonia concentration in treated flue gas B is eventually increased to a level of up to about 50 ppm.

Although ammonia is not yet an object of emission control in Japan, it is desirable from the viewpoint of air pollution prevention to minimize the ammonia concentration in treated flue gas B discharged into the atmosphere. Thus, there has been a demand for a flue gas treating process which can achieve a reduction in equipment size and a high degree of desulfurization and, moreover, can minimize the amount of ammonia emitted.

Accordingly, it is an object of the present invention to provide a flue gas treating system and process which, though having a basic construction using a gas-liquid contact apparatus of the type comprising the combination of a parallel-flow absorption tower and a counterflow absorption tower, can reduce the ammonia concentration in the treated flue gas to a low level.

SUMMARY OF THE INVENTION

In order to accomplish the above object, the present invention provides a flue gas treating system for removing at least sulfur dioxide and ammonia present in flue gas by gas-liquid contact with an absorbing fluid, the flue gas treating system including a tank for holding the absorbing fluid fed thereto; an inlet side absorption tower of the counterflow type which extends upward from one lateral part of the tank and in which untreated flue gas is introduced from its lower end and brought into gas-liquid contact with the absorbing fluid within the tank; and an outlet side absorption tower of the parallel-flow type which extends upward from another lateral part of the tank and in which the flue gas leaving the inlet side absorption tower is introduced from its upper end and brought into gas-liquid contact with the absorbing fluid within the tank.

The present invention also provides a flue gas treating process for removing at least sulfur dioxide and ammonia present in flue gas by using the above-described flue gas treating system, which comprises dividing the tank into parts corresponding to the absorption towers and separately controlling the properties of the absorbing fluid for each of the absorption towers whereby the pH of the absorbing fluid for the outlet side absorption tower is adjusted to a value sufficiently low to cause little ammonia to be released into the flue gas (e.g., a value in the range of 4.0 to 5.0).

Although the flue gas treating system of the present invention has a small-sized construction using a gas-liquid contact apparatus comprising the combination of a parallel-flow absorption tower and a counterflow absorption tower, it can effectively remove sulfur dioxide present in flue gas and, at the same time, can reduce the ammonia concentration in the treated flue gas to a much lower level than in the prior art. Consequently, air pollution due to harmful materials present in flue gas can be prevented in a more practical and perfect manner.

Especially where the tank is divided into parts corresponding to the absorption towers and the properties of the absorbing fluid for each of the absorption towers are separately controlled so that the pH of the absorbing fluid for the outlet side absorption tower is adjusted to a value sufficiently low to cause little ammonia to be released into the flue gas (e.g., a value in the range of 4.0 to 5.0), the ammonia concentration in the treated flue gas can be reliably maintained at a low level in spite of variation in the properties of untreated flue gas or the like.

BRIEF DESCRIPTION OF THE DRAWINGS

FIG. 3 is a schematic view illustrating a conventional flue gas treating system; and FIG. 4 is a graph showing the results of experiments on the relationship between the pH of the absorbing fluid and the equilibrium partial pressure of $NH_3$.

DETAILED DESCRIPTION OF PREFERRED EMBODIMENTS

Several embodiments of the present invention will be described hereinbelow with reference to the accompanying drawings.

(First Embodiment)

Figure 1:
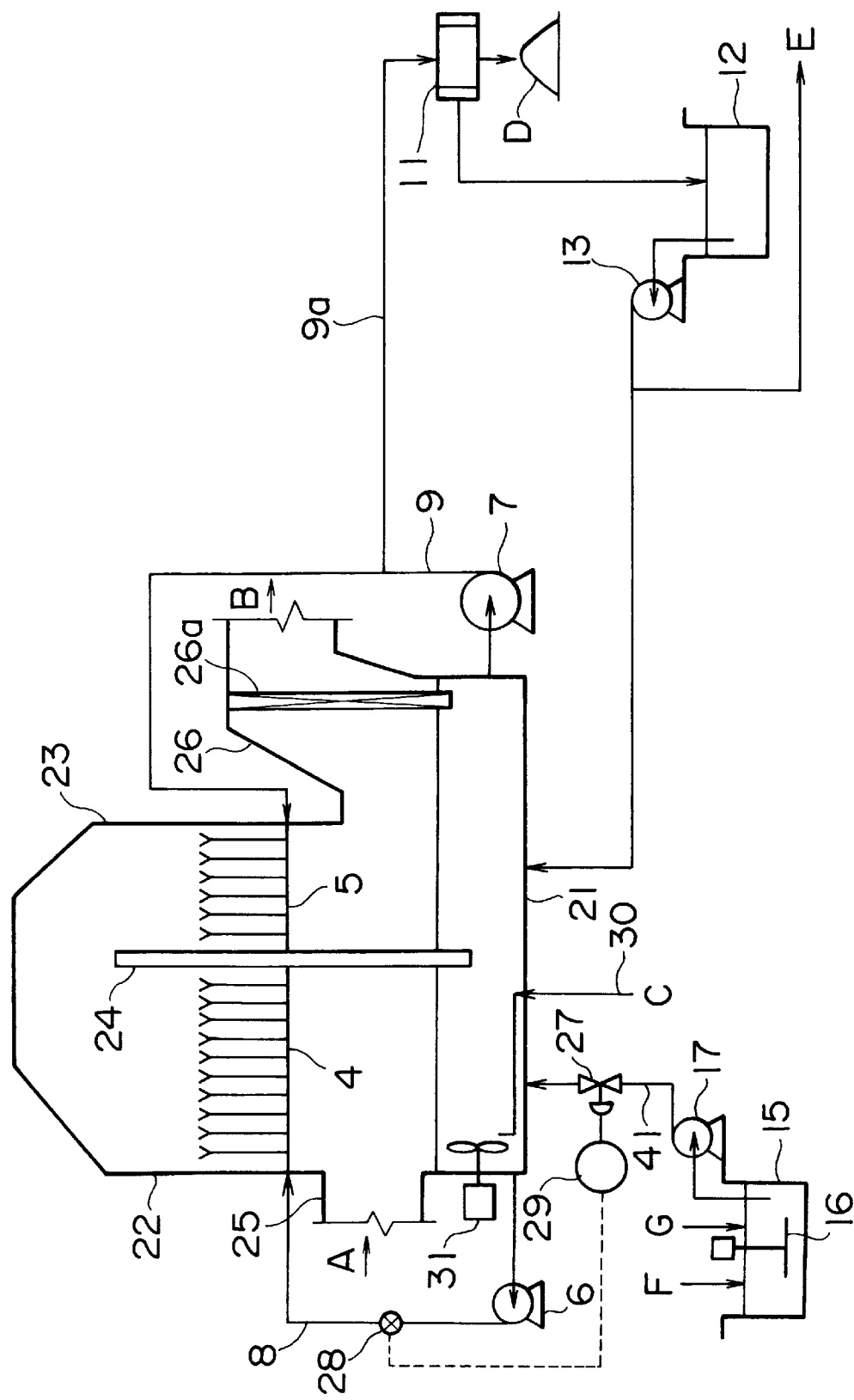
FIG. 1 is a schematic view illustrating the construction of a flue gas treating system in accordance with a first embodiment of the present invention.

FIG. 1 is a schematic view illustrating the construction of a flue gas treating system in accordance with a first embodiment of the present invention. First of all, the construction of this system is described below. The same elements as included in the conventional system of FIG. 3 are designated by the same reference numerals, and the explanation thereof is omitted.

This flue gas treating system includes a tank 21 for holding an absorbent slurry fed thereto, an inlet side absorption tower 22 of the liquid column type which extends upward from one lateral part of tank 21 and serves to bring untreated flue gas A into gas-liquid contact with the absorbent slurry within tank 21, and an outlet side absorption tower 23 of the liquid column type which extends upward from another lateral part of tank 21 and serves to bring the flue gas leaving inlet side absorption tower 22 into gas-liquid contact with the absorbent slurry within tank 21 again. Thus, flue gas is successively introduced into the two absorption towers of the counterflow and parallel-flow types in which it is successively brought into gas-liquid contact with the absorbent slurry.

In this embodiment, inlet side absorption tower 22 and outlet side absorption tower 23 have a flow path of uniform cross section at least in their gas-liquid contact regions, and are formed on both sides of a partition wall 24 disposed vertically so as to divide the space above tank 21. Inlet side absorption tower 22 is a so-called counterflow absorption tower in which a flue gas inlet section 25 for introducing untreated flue gas A is formed at its lower end so as to cause the flue gas to flow upward, and outlet side absorption tower 23 is a so-called parallel-flow absorption tower in which a flue gas outlet section 26 for discharging treated flue gas B is formed at its lower end so as to cause the flue gas having passed through inlet side absorption tower 22 and the connecting space above partition wall 24 to flow downward.

The feed rate of the absorbent supplied from a slurry preparation tank 15 for preparing an absorbent slurry is regulated by controlling the opening of a flow control valve 27 installed in a line 41 for supplying the absorbent to tank 21 by means of a pump 17. Specifically, the opening of flow control valve 27 is regulated in the usual manner by the action of a controller 29 which functions on the basis of the detection output of a limestone concentration sensor 28, the inlet sulfur dioxide concentration detected with a sensor (not shown), and the like. Thus, the pH of the absorbent slurry within tank 21 is maintained, as usual, at the optimum value (e.g., about 6.0) for the absorption and oxidation reaction of sulfur dioxide present in flue gas.

A mist eliminator 26a for collecting and removing entrained mist is installed in flue gas outlet section 26 of outlet side absorption tower 23. In this embodiment, the mist collected by this mist eliminator 26a is allowed to flow down from its lower end and return directly to tank 21.

Moreover, in this embodiment, the cross-sectional area of the flow path in outlet side absorption tower 23 is determined to be smaller than that in inlet side absorption tower 22. Thus, a higher flow velocity of the flue gas is achieved in outlet side absorption tower 23 where, in particular, the collection of dust is effectively achieved. On the other hand, a greater gas-liquid contact capacity is secured in inlet side absorption tower 22 where, in particular, the absorption of sulfur dioxide is effectively achieved.

Furthermore, in this embodiment, air C for oxidizing use is supplied to tank 21 through an air supply pipe 30. While the slurry within tank 21 is agitated with an agitator 31, air C for oxidizing use is divided into fine air bubbles. Thus, in the same manner as in the conventional system, the absorbent slurry having sulfur dioxide absorbed therein is brought into efficient contact with the air in tank 21 and thereby oxidized completely to form gypsum.

Now, the operation of the above-described flue gas treating system is explained below.

In the above-described system construction, untreated flue gas A is first introduced into inlet side absorption tower 22 of the counterflow type where it is brought into gas-liquid contact with the slurry spouted from spray pipes 4 in the form of liquid columns, so that dust and ammonia, together with sulfur dioxide, are absorbed or collected. Especially in this inlet side absorption tower 22, most of the sulfur dioxide and ammonia are removed owing to its great gas-liquid contact capacity.

Consequently, the flue gas passing through the connecting flow path above partition wall 24 and entering the upper part of outlet side absorption tower 23 contains little ammonia and sulfur dioxide. Subsequently, the remaining dust is chiefly collected and removed by gas-liquid contact in outlet side absorption tower 23.

In particular, the flow path in this outlet side absorption tower 23 is designed to have a smaller cross-sectional area so that the flue gas having a high velocity will come into contact with the slurry. As a result, the so-called collision dedusting is effectively achieved so as to enable dust present in the flue gas to be efficiently collected into the slurry.

Moreover, in outlet side absorption tower 23, the slurry immediately after being spouted from spray pipes 5 in the form of liquid columns has a relatively high pH value of about 6.0. However, when it has flowed down to the lower part of outlet side absorption tower 23, its pH is reduced to a value of about 4.0 to 5.0 as a result of the dissolution of sulfur dioxide. For this reason, the partial pressure of ammonia is suppressed in the vicinity of the outlet provided in the lower part of outlet side absorption tower 23, so that the conventionally known phenomenon in which the ammonia dissolved in the slurry is conversely released into the flue gas can be avoided. Consequently, treated flue gas B in which the concentrations of sulfur dioxide, dust and ammonia are reduced to a very low level is finally discharged from outlet side absorption tower 23. In particular, according to calculations made by the present inventor, even when the ammonia concentration in untreated flue gas A is of the order of 100 ppm, the ammonia concentration in treated flue gas B is reduced to a level of as low as about 5 ppm.

The slurry having absorbed or collected sulfur dioxide, dust and ammonia from flue gas in absorption towers 22 and 23 flows down into tank 21. The ammonia-containing mist scattered in the flue gas as a result of gas-liquid contact is collected by mist eliminator 26a and likewise returned to tank 21.

In tank 21, the sulfur dioxide absorbed into the slurry is oxidized by fine air bubbles blown into the slurry by means of air supply pipe 30 and agitator 31. Thus, gypsum is formed in the usual manner according to the aforesaid reaction formulas (1) to (3) and separated by means of a solid-liquid separator 11.

The ammonia absorbed from flue gas into the slurry in absorption towers 22 and 23 is separated into the liquid phase as a result of solid-liquid separation in solid-liquid separator 11, and finally discharged from the system in the form dissolved in desulfurization waste water E drained through a pipe line branching from the delivery side of pump 13.

Thus, though having a small-sized construction using a gas-liquid contact apparatus comprising the combination of a parallel-flow absorption tower and a counterflow absorption tower, the flue gas treating system of this embodiment can not only remove sulfur dioxide and dust effectively, but also reduce the ammonia concentration in the treated flue gas to a low level. Consequently, air pollution due to harmful materials present in flue gas can be prevented in a more practical and perfect manner.

Moreover, in the flue gas treating system of this embodiment, flue gas inlet section 25 and flue gas outlet section 26 are disposed at the lower ends of the respective absorption towers. Consequently, this embodiment has a unique effect in that the height of ducts connected thereto can be made considerably low and, therefore, the installation cost of these ducts can be significantly reduced.

(Second Embodiment)

Figure 2:
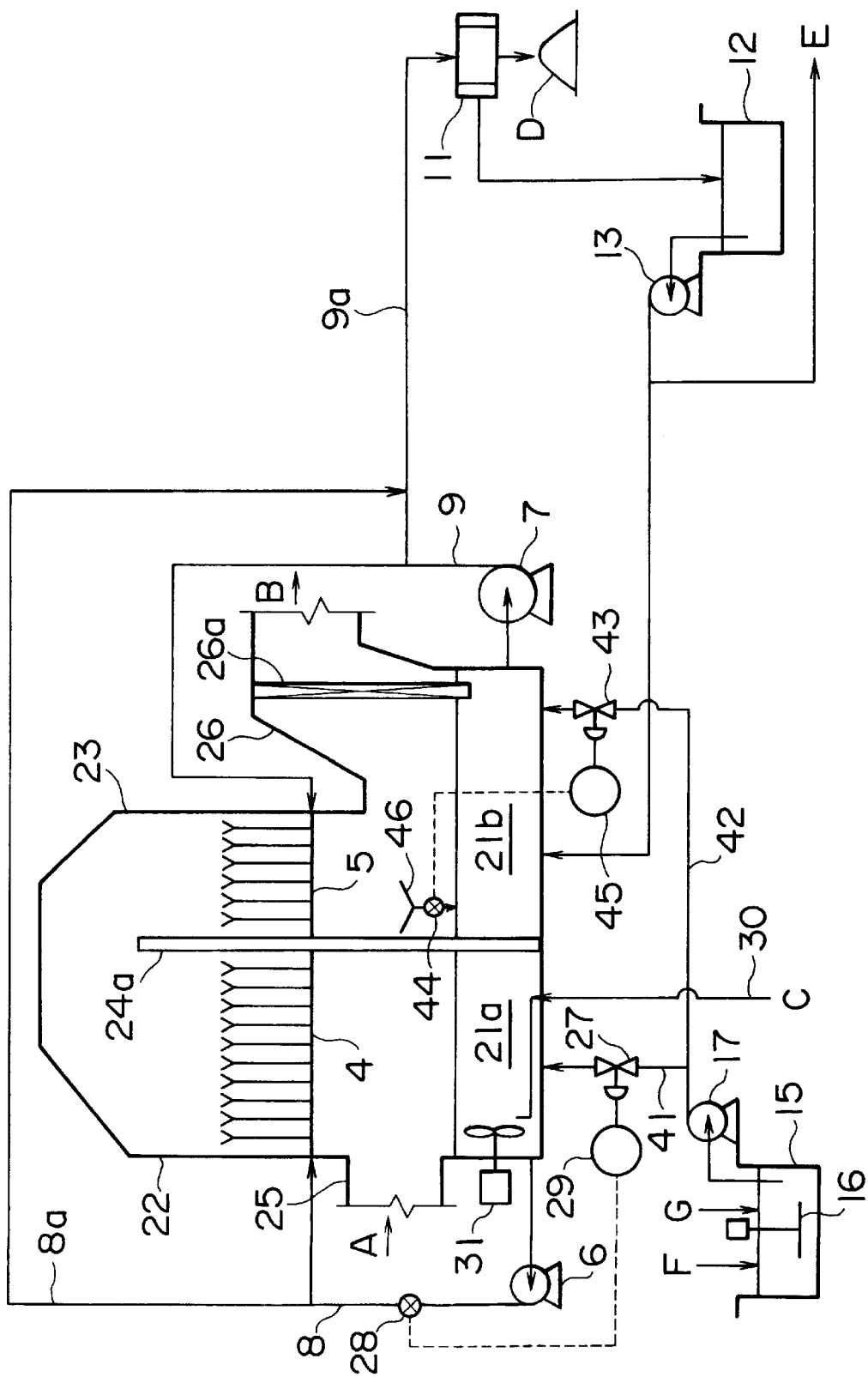
FIG. 2 is a schematic view illustrating the construction of a flue gas treating system in accordance with a second embodiment of the present invention.

Next, a second embodiment of the present invention is described below with reference to FIG. 2. FIG. 2 is a schematic view illustrating the construction of a system for carrying out the flue gas treating process of the present invention. The same elements as described in connection with the first embodiment of FIG. 1 are designated by the same reference numerals, and the explanation thereof is omitted. This embodiment is characterized by dividing tank 21 into parts corresponding to the absorption towers and separately controlling the properties of the absorbing fluid for each of the absorption towers whereby the pH of the absorbing fluid for outlet side absorption tower 23 is positively adjusted to a value sufficiently low to cause little ammonia to be released into the flue gas (e.g., a value in the range of 4.0 to 5.0). Except for this modification, the basic system construction of this embodiment is the same as that of the first embodiment.

In this embodiment, a partition wall 24a extending to the bottom of tank 21 is installed so as to divide tank 21 into an inlet side tank 21a and an outlet side tank 21b. Though not shown, outlet side tank 21b is provided with separate means similar to the aforesaid air supply pipe 30 for supplying air C for oxidizing use and the aforesaid agitator 31 for agitating the slurry while dividing this air C into fine air bubbles.

Moreover, the supply of the absorbent from slurry preparation tank 15 for preparing an absorbent slurry to tanks 21a and 21b is separately carried out by way of two pipe lines (i.e., lines 41 and 42) branching from the delivery side of pump 17.

In this case, the opening of a flow control valve 27 installed in line 41 for supplying the absorbent to inlet side tank 21a is regulated in the usual manner by the action of a controller 29 which functions on the basis of the detection output of a limestone concentration sensor 28, the inlet sulfur dioxide concentration detected with a sensor (not shown), and the like, as described previously. Thus, the pH of the slurry within inlet side tank 21a is maintained, as usual, at the optimum value (e.g., about 6.0) for the absorption and oxidation reaction of sulfur dioxide present in flue gas.

On the other hand, the opening of a flow control valve 43 installed in line 42 for supplying the absorbent to outlet side tank 21b is regulated by the action of a controller 45 which functions on the basis of the detection output of a pH sensor 44. Thus, the pH of the slurry flowing down through the lower part of outlet side absorption tower 23 is maintained at a value sufficiently low to cause little ammonia to be released into the flue gas (e.g., a value in the range of 4.0 to 5.0).

The aforesaid pH sensor 44 is designed to measure the pH of a portion of the slurry injected from spray pipes 5 and flowing down to the lower part of absorption tower 23 while coming into gas-liquid contact with the flue gas. Specifically, a slurry receiver 46 for receiving a portion of the falling slurry is disposed below spray pipes 5, and the pH of the slurry received by this slurry receiver 46 is measured with pH sensor 44 while it is returned to tank 21b through a pipe line connected to the bottom of slurry receiver 46.

The control by controller 45 is carried out in such a way that, if the pH value measured with pH sensor 44 exceeds a control target value (e.g., 4.5), the feed rate of the absorbent functioning as an alkaline agent is decreased by an amount corresponding to the proportional sensitivity, and if the pH value falls below the control target value, the feed rate of the absorbent is increased by an amount corresponding to the proportional sensitivity.

In this embodiment, ammonia, together with sulfur dioxide and dust, is effectively removed from flue gas in basically the same manner as in the first embodiment. However, since the pH of the absorbent slurry flowing down through the lower part of outlet side absorption tower 23 is positively adjusted to a low value in this embodiment, the release of ammonia can be avoided with high reliability and, therefore, the ammonia concentration in treated flue gas B can be reliably maintained at a low level in spite of variation in the properties of untreated flue gas A or the like.

For example, if the concentration of sulfur dioxide in untreated flue gas A is abnormally reduced for some reason, the flue gas leaving inlet side absorption tower 22 and entering outlet side absorption tower 23 will contain essentially no residual sulfur dioxide. In such a case, there is a possibility that the pH of the absorbent slurry will not be sufficiently reduced even after the absorbent slurry is injected into outlet side absorption tower 23 and brought into gas-liquid contact with the flue gas, and the ammonia contained in the absorbent slurry will be released into the flue gas. In this embodiment, however, the pH of the absorbent slurry flowing down to the lower part of outlet side absorption tower 23 is always monitored with pH sensor 44. If this pH begins to rise, the feed rate of the absorbent is decreased by the above-described action of controller 45, so that the pH of the absorbent slurry within outlet side tank 21b is adjusted to a correspondingly lower value than usual. Thus, the pH of the absorbent slurry flowing down to the lower part of outlet side absorption tower 23 is always maintained at a low level. Consequently, the release of ammonia from the absorbent slurry into the gas in the lower part of outlet side absorption tower 23 (i.e., at the outlet of the absorption tower) can be reliably avoided.

It is to be understood that the present invention is not limited to the above-described two embodiments, but may also be practice in various other ways. For example, each absorption tower need not necessarily comprise an absorption tower of the liquid column type, but may comprise an absorption tower of the simple spray tower or packed tower type. However, since an absorption tower of the liquid column type has markedly higher dedusting capability, it is advisable to employ an absorption tower of the liquid column type in cases where flue gas contains a large amount of dust.

Moreover, the method for adjusting the pH of the absorbing fluid is not limited to the method comprising controlling the feed rate of the absorbent (i.e., limestone) as described in the foregoing embodiments, but the pH may also be adjust, for example, by separately adding a chemical agent such as sodium hydroxide.

In practice, the pH value of the absorbing fluid for the outlet side absorption tower (i.e., the value sufficiently low to cause little ammonia to be released into the flue gas) may be suitably determined according to the ammonia concentration in the untreated flue gas and the allowable ammonia concentration (target value) in the treated flue gas, on the basis of the relationship described below with reference to FIG. 4.

Specifically, as can be seen from the experimental results shown in FIG. 4, the relationship between the pH of the absorbing fluid and the equilibrium partial pressure of $NH_3$ (i.e., the ammonia concentration in the gas) varies with the amount of $NH_4^+$ accumulated in the absorbing fluid. Accordingly, on the basis of the relationship shown in FIG. 4, the upper limit of the aforesaid pH value may be determined according to the amount of $NH_4^+$ accumulated in the absorbing fluid which varies with the ammonia concentration in the untreated flue gas, and the allowable ammonia concentration in the treated flue gas.

For example, in the case of a desulfurizer for VR-fired or asphalt-fired boilers, the concentration of ammonia accumulated in the absorbing fluid is of the order of 500 mmol/l. Accordingly, in order to reduce the ammonia concentration in the treated flue gas, for example, to 10 ppm or less, it is sufficient to maintain the pH at a value of 5.0 or less as is evident from FIG. 4. If no margin is taken into account, the pH may be maintained at about 5.2.

In the case of a desulfurizer for coal-fired boilers, it is usual that no ammonia is injected on the upstream side of the desulfurizer. Accordingly, the ammonia concentration in the absorbing fluid is of the order of 5 mmol/l, and the existing processes (in which the pH has a value of, for example, about 6.0) pose no problem. However, in cases where ammonia is injected into the absorbing fluid in order, for example, to improve desulfurization capability, it is advisable to adjust the pH of the absorbing fluid for the outlet side absorption tower to a low value which may be determined according to the degree of ammonia injection on the basis of the relationship shown in FIG. 4.

However, it is desirable to maintain the desulfurization capability of the system and the quality of gypsum at a higher level. Moreover, since the absorbing fluid has a highly corrosive action on the equipment materials at a pH of less than 4, corrosion-resistant materials of higher quality are required and this detracts from economic efficiency. If these facts are taken into account, the lower limit of the pH value should preferably be 4 or greater. On the other hand, as can be seen from FIG. 4, the upper limit of the pH value should preferably be 5.0 or less so that, in the case of desulfurization for oil-fired boilers, the ammonia concentration in the treated flue gas may be reduced to 10 ppm or less under practical conditions and with high reliability.

We claim:

1. A flue gas treating system for removing at least sulfur dioxide and ammonia present in flue gas by gas-liquid contact with an absorbing fluid, said flue gas treating system comprising:

a tank for holding the absorbing fluid fed thereto;

an inlet side counterflow absorption tower which extends upward from one lateral part of said tank and in which untreated flue gas is introduced from a lower end of said inlet side counterflow absorption tower and brought into gas-liquid contact with the absorbing fluid within said tank;

an outlet side parallel-flow absorption tower which extends upward from another lateral part of said tank and in which the flue gas leaving said inlet side absorption tower is introduced to an upper end of said outlet side parallel-flow absorption tower and brought into gas-liquid contact with the absorbing fluid within said tank;

a pH sensor in fluid communication with the outlet side parallel-flow absorption tower to measure the pH of slurry present in a lower part of the outlet side parallel-flow absorption tower;

a controller to adjust a feed rate of absorbent functioning as an alkaline agent, said controller in communication with said pH sensor;

wherein said inlet side counterflow absorption tower and said outlet side parallel-flow absorption tower are separated by a partition wall disposed vertically so as to divide space above said tank and allow flue gas to enter the outlet side parallel-flow absorption tower from the inlet side counterflow absorption tower, wherein the flue gas entering the outlet side parallel-flow absorption tower has sulfur dioxide and ammonia removed therefrom, and wherein the pH of the slurry in the outlet side parallel-flow absorption tower is maintained between about 4.0 and 5.0 to suppress release of ammonia into the flue gas, and wherein the slurry in the inlet side counterflow absorption tower has a higher pH relative to the pH of the slurry in the outlet side parallel-flow absorption tower to effectively remove sulfur dioxide present in the flue gas.

2. A flue gas treating system according to claim 1, wherein each of said inlet side counterflow absorption tower and said outlet side parallel-flow absorption tower have a flow path of uniform cross section.

3. A flue gas treating system according to claim 1, wherein said outlet side parallel-flow absorption tower comprises a flue gas outlet section.

4. A flue gas treating system according to claim 3, wherein said flue gas outlet section comprises a mist eliminator to collect and remove entrained mist.

5. A flue gas treating system according to claim 1, wherein a cross-sectional area of a flow path of the outlet side parallel-flow absorption tower is smaller that the cross-sectional area of a flow path of the inlet side counterflow absorption tower.

\* \* \* \* \*